Patented June 14, 1949

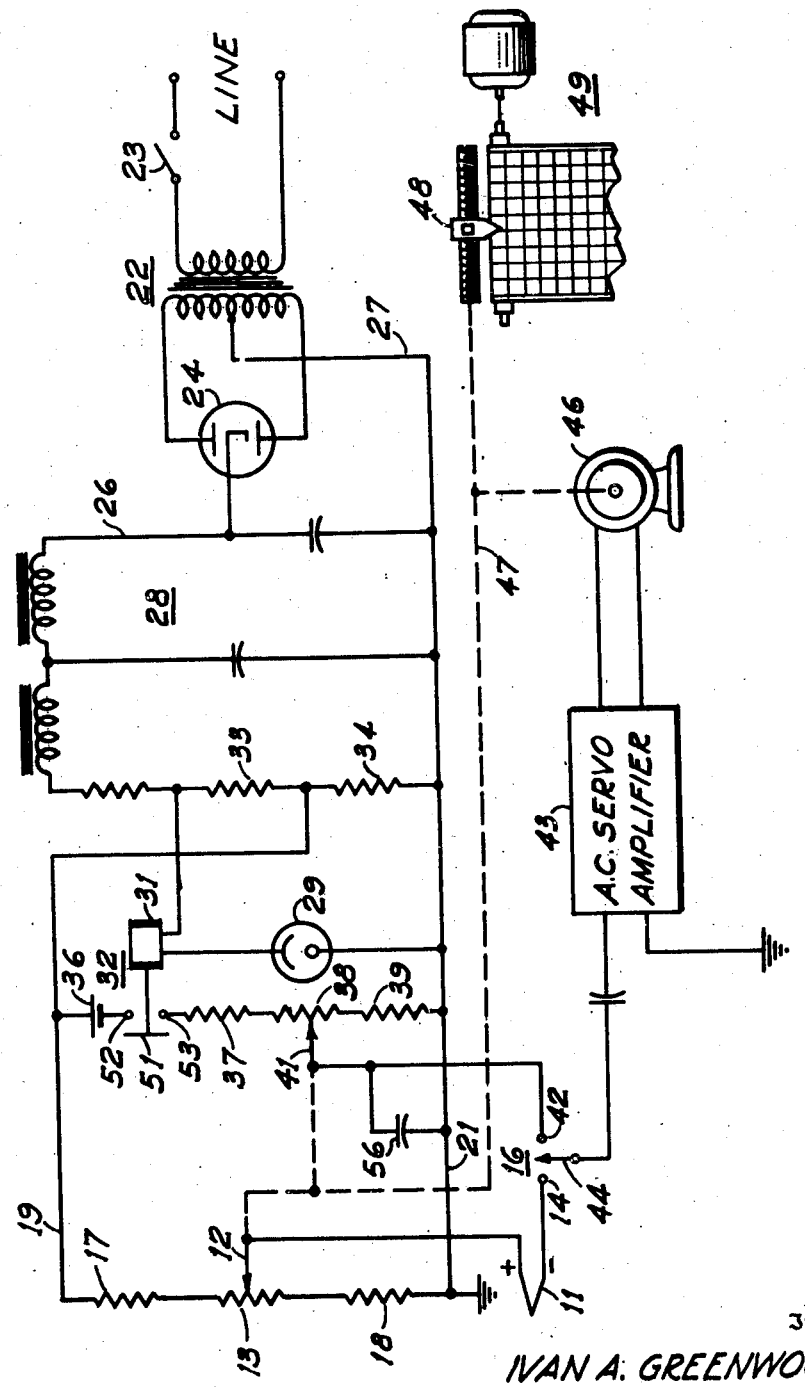

2,473,334

UNITED STATES PATENT OFFICE 2,473,334

POTENTIOMETRIC CIRCUIT

Ivan A. Greenwood, Jr., Pleasantville, N. Y., assignor to General Precision Laboratory Incorporated, a corporation of New York Application August 27, 1948, Serial No. 46,415

9 Claims. (Cl. 318—28)

1

This invention relates to a potentiometric circuit particularly adapted for use in recording and controlling circuits wherein a variable electrical quantity which is to be utilized for measuring or control purposes is compared with a second electrical quantity made to be variable in accordance with the actuation of the measuring or control device to produce an "error signal."

In such devices the "error signal," that is, the disagreement between electrical quantities, after suitable amplification constitutes the desired motive power for actuation of the measuring or control device. Inasmuch as the second electrical quantity is varied by the motive power which acts to operate the measuring or control device, the relationships may be made such that when the measuring or control device is operated to such an extent as to be substantially representative of the first electrical quantity, the second electrical quantity is substantially equal and opposite to the first. Under such circumstances the "error signal" is substantially zero or a "null" and motive power is not available for operating the control or measuring means so that it is stopped at exactly the required point.

The second or comparing electrical quantity is ordinarily derived from a potentiometer or slide wire connected across a voltage source, the variation thereof being achieved by moving the variable contact thereof in accordance with the operation of the control or measuring device. If the voltage source across the potentiometer or slide wire is maintained absolutely constant then the proportional amount of the voltage derived therefrom to oppose the voltage representative of the controlling or measuring electrical quantity is always in direct proportion thereto and the measuring or control device is actuated in exact relation to the first electrical quantity. It is ordinarily not feasible, however, to obtain such constancy of potential from known sources of supply which permit of the current drain necessarily resulting by the connection thereto of a potentiometer of conceivable range commensurate with the desired accuracy. Regulated supply sources of the type using a gaseous reference or voltage regulator tube, vary in their output voltage in the order of 1% and since this variation introduces a commensurate variation in the comparison voltage the accuracy of the control or

2 measuring means is subject to an error of like amount.

Heretofore, it has been the general practice to periodically correct for any variation in voltage of the supply source by comparing the supply voltage with the voltage of a standard cell such as the cadmium/cadmium sulphate cell known as the standard Weston cell as described by Vosburgh in volume 47, May, 1925, of the Journal of the American Chemical Society at pages 1255 to 1267. The standard cell is momentarily connected in circuit and a potentiometer device adjusted to correct for any departures of the voltage source from the desired constant value. Such arrangements, however, require additional equipment and have the disadvantage that the recording or control function is interrupted during the time that the circuit is being readjusted. Likewise since the comparison and readjustment occurs only at intervals any variation in supply voltage that may occur between periods of readjustment is reflected in a proportional inaccuracy in recording or control.

In the present invention these difficulties are obviated by the provision of circuit arrangements whereby a standard cell may be continuously connected in circuit to provide a standard of comparison and the effect of any error or departure of the voltage of the supply source as respects the standard is continuously and constantly balanced out so that the measuring or control means at no time is affected thereby.

At the same time despite the fact that the standard cell is continuously connected in circuit at all times that the voltage regulating source is in operation, the circuit arrangements are so devised that the steady current drain on the standard cell is of such low magnitude as not materially to affect its accuracy as a standard of voltage comparison. Very little current may be drawn from a standard cell without causing a reduction in potential produced thereby and when such a reduction in potential occurs a considerable period of inactivity is required before the standard cell may recover sufficiently to again produce its standardized potential.

It has been found, however, that if the steady drain on the standard cell is maintained in the order of 1 microampere or less the standard cell will change in potential by less than .1%

In the present invention therefore the standard cell is connected in such fashion as to oppose the regulated supply voltage and resistances of such values are connected in series therewith that any difference in voltage produced by variation of potential of the regulated supply will not result in a current drain in excess of 1 microampere. At the same time any difference in potential which may exist between the standardized voltage of the standard cell and the voltage of the supply is opposed in a directly proportional amount to the proportional variation in the feedback voltage which results from the departure of the supply voltage from its standard. Thus the error which would otherwise result because of the variation of the supply voltage is effectively canceled.

The exact nature of the invention will be more readily understood from the following detailed description when considered in connection with the attached drawing in which the single figure is a schematic representation of a circuit embodying the invention.

Referring now to the figure, the electrical quantity which is to be measured, recorded or act as the controlling means is illustrated as being derived by a thermocouple 11. The instant invention, however, is not to be construed as limited to the use of such a device as it is equally applicable to the use of other sources of electrical effect, either of high or low impedance, as for example, photocells, pH cells, devices for translating mechanical movements into electrical effects and the like. The particular application to which the invention is put being the controlling factor.

One terminal of the thermocouple 11 is connected to a variable contact 12 of a potentiometer 13, while the other is connected to one contact 14 of a vibrator or interrupter 16. The potentiometer 13 is connected in series with resistors 17 and 18 and the entire series network is connected to a source of regulated voltage supply through conductors 19 and 21.

The source of regulated voltage supply is here diagrammatically illustrated as comprising a transformer 22, the primary of which is energized from the usual alternating current mains through a switch 23 and the secondary of which energizes a full wave rectifier 24. The output of the rectifier is connected through conductors 26 and 27 to the input of a filter network indicated generally by the reference character 28. Across the output of the filter network there is connected a voltage regulator tube 29 in series with the actuating coil 31 of a relay 32, the purpose of which will be described later. Thus the voltage supplied to the dividing network consisting of series connected resistors 33 and 34 is regulated within a range of say ±1% of the desired value.

The desired portion of the voltage existing across the output of the regulated supply source, which is to be impressed on the series network consisting of resistors 17 and 18 and potentiometer or slide wire 13, is obtained by connecting the conductor 19 to the common juncture of resistors 33 and 34; the relative values thereof being selected to produce the proper voltage drop between conductors 19 and 21.

Ignoring for the moment the circuit consisting of the standard cell 36, resistors 37 and 39 and potentiometer 38 and assuming for the purposes of preliminary discussion that the contact 42 of the vibrator 16 is connected directly to the grounded conductor 21 rather than the movable contact 41; it will be apparent that the input to the amplifier 43 consists of an alternating current wave the amplitude of which comprises the difference in the voltage generated by the source 11 and the voltage drop existing across the resistor 18 and that portion of the potentiometer 13 included between the point of contact of the movable contact 12 and the lower end thereof. This alternating current wave produced by the alternate and vibrating contact of the armature 44 with the contacts 14 and 42 is of one sense or the opposite sense, depending on whether the voltage generated by the source 11 is greater or less than the voltage drop across the aforementioned portion of the potentiometer 13 and resistor 18.

This alternating current is amplified by the alternating current servo amplifier 43, which may be of any suitable type, and the output thereof constitutes the means for energizing a motor 46, which is caused to rotate in one direction or the other depending on the sense of the input signal and hence that of the output.

The motor 46 through a shaft 47 operates the movable contact 12 in a direction such that the voltage drop across the lower portion of the potentiometer 13 and resistor 18 tends to balance and offset that generated by the source 11. At the same time the motor 46 operates a utilization device here illustrated, by way of example only, as a recording pen 48 of a chart recorder 49. The invention is not limited to this type of utilization device, as whether the device shown or a controlling circuit for varying fluid pressures, fuel supply or any of other numerous controlling, measuring and recording devices or combinations thereof are used will depend on the particular application to which the invention is put.

Suppose, for example, the voltage generated by the source 11 increases, then since this voltage is greater than that produced by the potential drop across the lower portion of the potentiometer 13 and resistor 18 there will be impressed on the input of the amplifier 43 a potential varying between a positive value representative of this difference and ground potential, the contact 42 still being assumed as connected directly to conductor 21, in a square wave fashion by action of the interrupter 16. This alternating input termed the "error signal" after amplification by the amplifier 43 energizes the motor 46 causing it to revolve in such a direction as to move the contact 12 upwardly on the potentiometer 13 thereby increasing the voltage drop which is opposed to the voltage of the source 11, the utilization device 49 also being operated in the proper direction at the same time. The motor 46 will continue to rotate until the contact 12 has been moved to such an extent that the voltage drop existing between the contact 12 and the conductor 21 just balances the new voltage conditions of the source 11. When such a balance occurs no difference of potential exists at the contact 14 and contacts 14 and 22 are at the same potential so that there is zero "error signal" or a "null" and hence no input to the amplifier 43 and no energization for the motor 46. The motor 46 therefore ceases to rotate after having moved the contact 12 to the new balanced conditions and the utilization device 49 to a new operative position.

It will be seen that if the potentiometer 13 is made linear and the potential impressed across conductors 19 and 21 is at all times constant, then the contact 12 and utilization device 49 will at all times be positioned accurately in accordance with the then voltage of the source 11.

If, however, the voltage impressed across conductors 19 and 21 should vary, the potential drop across the lower portion of potentiometer 13 and resistor 18 will also vary by a proportionate amount, thereby producing an "error signal" even though the voltage of the source 11 has not changed. This will result in a corresponding inaccurate positioning of the utilization device 49 and inasmuch as regulated supply sources have some variation in the potential supply produced thereby, this inaccuracy of operation will result in the absence of corrective circuit arrangements.

In order that a continuous correction for any variations in supply voltage may be introduced, the present invention contemplates the use of the series circuit consisting of a standard cell 36, for example, the cadmium/cadmium sulphate type known as the standard Weston cell as discussed by Vosburgh in the article in the Journal of the American Chemical Society supra; a resistor 37 potentiometer 38 and resistor 39 connected between the conductors 19 and 21. The movable contact 41 of the potentiometer 38 is connected to the motor shaft 47 so that it is moved in unison with the movable contact 12 and while the potentiometer 38 is of high impedance while potentiometer 13 may be of low impedance the resistors 18 and 39 and 17 and 37 have such values that the same proportional relation exists between resistors 18 and 39 and between resistors 17 and 37 as exists between the potentiometer 13 and the potentiometer 38. The standard cell is connected with its E. M. F. opposing the E. M. F. of the regulated supply source and the values of the voltage dividing circuit consisting of resistors 33 and 34 are made such that the average voltage supplied between conductors 19 and 21 and hence opposing the standardized voltage of the standard cell is nominally the same as the voltage thereof.

Assuming now that the relay 32 has been actuated so that the armature 51 bridges contacts 52 and 53, the only voltage drop which exists across the resistors 37, 39 and potentiometer 38 will be that resulting from the departure of the supply source potential from the voltage of the standard cell. Because a fairly uncomplicated supply circuit using a voltage regulator gas cell such as 29 can be constructed to regulate the voltage produced thereby within a range of 1% and since the voltage of a standard cell is of the order of 1.018 volts, the maximum potential existing across the network comprising resistors 37, 39 and potentiometer 38 will be approximately .01 volt. If then the sum of the resistances of these elements is made greater than 10,000 ohms the current drain on the standard cell may be kept at 1 microampere or less. When the current drain is kept at this low value its standardization accuracy does not vary by more than 0.1% even though the drain be continuous for long periods of time and the resistances which must be employed to so limit the drain are well within limits in which potentiometers such as 38 may be constructed. The accuracy of the potentiometer 38 need not be excessive since the only errors introduced thereby are second order errors.

For purposes of explanation let it be assumed that the voltage $E_s$ is the standardized voltage of the standard cell and the voltage which should be impressed between conductors 19 and 21 if accurate operation without the use of the instrumentalities of the invention is to be had. Let it be further assumed, however, that the voltage of the supply source has varied to such an extent that the voltage supplied thereby to the conductors 19 and 21 departs from the voltage $E_s$ by an amount $\Delta E$. The voltage available between the contact 12 of the potentiometer 13 and the conductor 21 which is opposed to the potential developed by the source 11 may then be expressed by the expression:

$$(E_S \pm \Delta E)\left(\frac{XR_2+R_3}{R_1+R_2+R_3}\right) \quad (1)$$

$$E_S\left(\frac{XR_2+R_3}{R_1+R_2+R_3}\right) \pm \Delta E\left(\frac{XR_2+R_3}{R_1+R_2+R_3}\right) \quad (2)$$

where X is the portion of the resistance $R_2$ of the potentiometer 13 included between the contact 12 and the lower end of the potentiometer, $R_1$ is the resistance of resistor 17, $R_2$ the resistance of the potentiometer 13, and $R_3$ is the resistance of the resistor 18. The first term of the expression is the term which constitutes the accurate balance voltage desired while the second term constitutes the undesired error and may be positive or negative depending on whether the voltage of the regulated supply is above or below that of the standard cell.

If the contact 42 were connected to the grounded conductor 21 as has heretofore been assumed for the purposes of preliminary discussion, then the peak to peak amplitude of the alternating current wave impressed on the input of the amplifier 43 and which constitutes the "error signal" would be given by the expression:

$$E - E_S\left(\frac{XR_2+R_3}{R_1+R_2+R_3}\right) - \Delta E\left(\frac{XR_2+R_3}{R_1-R_2-R_3}\right) \quad (3)$$

where E is the voltage generated by the source 11 and the other terms are as given in Expression 2. It will be noted that the error term is incorporated in this expression, and the negative sign has been used under the assumption that the voltage of the regulated supply exceeds that of the standard cell which assumption will be continued hereinafter for simplicity of expression.

The contact 42, however, in this invention is connected to the movable contact 41 of the potentiometer 38 which together with resistors 37 and 39 are connected in circuit with the standard cell 36 opposing the voltage of the regulated supply source. The potential drop across the series combination of resistors 37, 39 and potentiometer 38, therefore, will be the difference in the voltage of the standard cell and that of the regulated supply source or $\Delta E$. Likewise the portion thereof which is impressed between the terminal 41 and grounded conductor 21 is given by the expression:

$$\Delta E\left(\frac{X_1 R_5+R_6}{R_4+R_5+R_6}\right) \quad (4)$$

where $R_5$ is the resistance of the potentiometer 38, $R_4$ and $R_6$ the resistances of the respective resistors 37 and 38 and $X_1$ the fractional displacement of the movable contact 41. The terminal 42, therefore, is not at ground potential but above ground by a potential given by the Expression 4.

The peak to peak alternating current "error signal," therefore, is not as given in Expression 3 but rather:

$$E - E_S\left(\frac{XR_2+R_3}{R_1+R_2+R_3}\right) - \Delta E\left(\frac{XR_2+R_3}{R_1+R_2+R_3}\right) + \quad (5)$$

$$\Delta E\left(\frac{X_1 R_5+R_6}{R_4+R_5+R_6}\right)$$

The movable contacts 12 and 41 are each actuated by the motor shaft 47 so that each is displaced by the same amount and X is always equal to $X_1$. Likewise, since, as heretofore stated $R_2$ is proportional to $R_5$, $R_1$ proportional to $R_4$ and $R_3$ proportional to $R_6$, the fraction $$\frac{R_2+R_3}{R_1+R_2+R_3}$$

is equal to $$\frac{R_5-R_6}{R_4+R_5+R_6}$$

and these fractions may be replaced by the identical constant K and Expression 5 simplified to:

$$E-E_sXK-\Delta EXK+\Delta EXK \quad (6)$$

The error voltage then becomes:

$$E-E_sXK \quad (7)$$

and the supply voltage error term drops out so that regardless of variations in power supply voltage accurate measurements or control functions always take place.

A condenser 56 is connected between the movable contact 41 and the grounded conductor 21 to present a relatively low impedance to alternating current, this condenser should not be so large, however, to drain an excessive amount of power from the standard cell 36 as the armature 44 vibrates between the contacts 14 and 42.

Inasmuch as the drain of any considerable current from the standard cell will cause it to depart from its standardized voltage requiring considerable time for recovery it is deemed advisable, although not absolutely essential, to provide protective means so that the standard cell is not connected in circuit until the voltage regulating tube 29 is operating properly and, therefore, the voltage of the standard cell is not opposed to voltages, supplied from the regulated supply source of too large a variation which might result in a drain from the standard cell of a current in excess of the amount found safe for its continuous operation.

To this end a quick release relay 32 has its actuating coil connected in series with the voltage regulator cell and its armature 51 does not bridge the contacts 52 and 53 to connect the standard cell in circuit until the proper operating current is flowing through the voltage regulator tube 29.

What is claimed is:

1. A device of the class described comprising, means for producing a variable voltage, means for producing a voltage subject to departures from a standard, a first device for selecting a variable portion of said voltage subject to departure from standard, means for opposing said variable voltage and the selected portion of said voltage subject to departure from standard to produce a first difference voltage, a standard voltage source of constant potential, circuit means for continuously opposing said standard voltage to said voltage subject to departure from standard to obtain a second difference voltage function of said departure from standard, a second device for selecting a variable portion of said second difference voltage, means for producing an alternating-current signal whose amplitude is a function of the difference of the variably selected portions of said first and second difference voltages and motor means operative in accordance with the sense and amplitude of said alternating current signal for concomitantly and proportionally adjusting said first and second devices.

2. A device of the class described comprising, means for producing a variable voltage, means for producing a voltage subject to departures from a standard, a first device for selecting a variable portion of said voltage subject to departure from standard, means for opposing said variable voltage and the selected portion of said voltage subject to departure from standard to produce a first difference voltage, a standard voltage source of constant potential, circuit means for continuously opposing said standard voltage to said voltage subject to departure from standard to obtain a second difference voltage function of the amount of departure from said standard, a second device for selecting a variable portion of said second difference voltage, an amplifier, an input circuit therefor on which said first and second difference voltages are impressed in opposed relation, and motor means operative by said amplifier output for actuating a utilization mechanism and connected to concomitantly and proportionally adjust said first and second devices.

3. A device of the class described comprising a regulated voltage supply source subject to slight errors of regulation, a circuit including a first potentiometer means connected in shunt thereto having its movable member connected to one terminal of a source of variable potential, a source of standardized potential, circuit means including a second potentiometer connecting said standardized potential source in opposed relation to said regulated voltage supply whereby the voltage drop produced across said second potentiometer is proportional to the departure of said regulated supply source from the standardized potential, an amplifier, an input circuit therefor, circuit means connecting the remaining terminal of said source of variable potential and the moving member of said second potentiometer to said input, motor means operated in accordance with said amplifier output, said motor means being connected to a utilization device and to the movable member of said first and second potentiometers for conjoint proportional actuation thereof.

4. In a potentiometric system wherein a varying voltage representative of a variable condition is opposed to an adjustable voltage to produce an "error signal" constituting the motive power for actuating a utilization circuit and simultaneously readjusting the adjustable voltage to restore balance to the system and wherein the adjustable voltage is subject to fluctuations in power supply voltage, means for nullifying the effect of said fluctuations on the accuracy of operation comprising a standard nonvarying voltage supply source continuously connected in opposition to said power supply through a potentiometric network of sufficiently high impedance to prevent undue current drain on said standard source, said potentiometric network developing a voltage thereacross proportional to the amount of variation of said power supply potential from said standard potential, circuit connections for deriving a portion of the voltage developed across said network and for opposing said derived portion to said "error signal" and motive means for varying the derived portion in direct relation to the readjustment of said adjustable voltage.

5. A potentiometric system in accordance with claim 4 in which said circuit connections include an amplifier having a modulator means connected in its input circuit and to said potentiometric circuit to alternately and successively impress said "error signal" and the derived portion of the voltage proportional to the departure of said power supply voltage from the standard on said amplifier input circuit.

6. A potentiometric circuit comprising, a regulated power supply subject to slight variations in the voltage produced thereby, a circuit connected in shunt to the output of said power supply at all times that said power supply is in its operative regulatory condition comprising, a standard cell connected in voltage opposition to said power supply and in series with a first potentiometric network whose resistance is sufficiently high to prevent undue current drain from said standard cell when said power supply is in its operative regulatory condition, a second potentiometric network connected in shunt to said power supply, a device for producing a varying voltage representative of a variable condition, circuit means connecting said device to the movable contact of said second potentiometric network whereby the voltage produced by said device is opposed to a portion of the voltage drop produced across said second potentiometric network to produce a difference voltage, an amplifier, an input circuit therefor connected to said device for producing a variable voltage representative of a variable condition and to the movable contact of said second potentiometric network to produce a second difference voltage equal to the difference between said first difference voltage and a portion of the voltage drop produced across said first potentiometric network, and motor means operated by said amplifier for conjointly actuating the movable contacts of said first and second potentiometric networks.

7. A potentiometric circuit in accordance with claim 6 in which said power supply circuit includes a voltage regulator tube and means in series therewith actuated by the operating current flow through said regulator tube for connecting said standard cell and said first potentiometric network in shunt to said power supply circuit.

8. A potentiometric circuit comprising, a regulated power supply circuit subject to slight variations in the voltage produced thereby, a circuit connected in shunt to the output of said power supply at all times that said power supply is in its operative regulatory condition comprising, a standard cell connected in voltage opposition to said power supply and in series with a first potentiometric network whose resistance is sufficiently high to prevent undue current drain from said standard cell when said power supply is in its operative regulatory condition, a second potentiometric network connected in shunt to said power supply, a device for producing a varying voltage representative of a variable condition having one terminal thereof connected to the movable contact of said second potentiometric network and the other terminal thereof connected to a first stationary contact of an interrupter, a connection from the movable contact of said first potentiometric network to a second stationary contact of said interrupter, an amplifier, an input circuit therefor comprising a connection to an armature of said interrupter which alternately engages said first and second stationary contacts and a connection to a common terminal of said first and second potentiometric networks, and a motor operated by the output of said amplifier and mechanically connected to the movable contacts of said first and second potentiometric networks for conjoint and equal mechanical actuation thereof.

9. A potentiometric circuit in accordance with claim 8 in which said power supply circuit includes a voltage regulator tube and means in series therewith actuated by the operating current flow through said regulator tube for connecting said standard cell and said first potentiometric network in shunt to said power supply circuit.

IVAN A. GREENWOOD, Jr.

No references cited.